United States Patent [19]

Taylor et al.

[11] 4,055,441

[45] Oct. 25, 1977

[54] PROCESS FOR RECOVERING, RECYCLING AND REUSING A COMPOSITE CONTAINER

[75] Inventors: Lynn Johnston Taylor; Henry Neal Troy, both of Toledo, Ohio

[73] Assignee: Owens-Illinois, Inc., Toledo, Ohio

[21] Appl. No.: 747,753

[22] Filed: Dec. 6, 1976

Related U.S. Application Data

[60] Division of Ser. No. 541,416, Jan. 16, 1975, which is a continuation-in-part of Ser. No. 189,450, Oct. 14, 1971, abandoned.

[51] Int. Cl.$^2$ .......................... B08B 7/34; B05B 1/40
[52] U.S. Cl. ...................................... 134/10; 134/38; 428/35; 428/213; 428/313; 428/334; 428/339; 427/154; 427/345; 427/385 A
[58] Field of Search ............... 427/385 A, 154, 345; 134/10, 38; 428/35, 212, 216, 313, 315, 320, 332, 334, 339, 430, 431, 435, 436, 439, 441, 442; 215/12 R, DIG. 6

[56] References Cited

U.S. PATENT DOCUMENTS

| | | | |
|---|---|---|---|
| 2,761,799 | 9/1956 | Schroeder | 134/10 |
| 3,379,559 | 4/1968 | Gerhardt | 117/94 |
| 3,498,825 | 3/1970 | Wiens | 117/94 |
| 3,549,448 | 12/1970 | Dearing | 156/250 |
| 3,554,787 | 1/1971 | Plymate | 117/94 |
| 3,577,256 | 5/1971 | Benford et al. | 117/6 |
| 3,604,584 | 9/1971 | Shank | 215/12 R |
| 3,698,586 | 10/1972 | Terner | 215/12 R |
| 3,760,968 | 9/1973 | Amberg et al. | 215/12 R |
| 3,868,960 | 3/1975 | Cove et al. | 134/10 |
| 3,889,031 | 6/1975 | Tatsumi et al. | 428/35 |
| 3,919,440 | 11/1975 | Takahashi et al. | 428/35 |
| 3,920,869 | 11/1975 | Eckett et al. | 428/35 |
| 3,922,450 | 11/1975 | Stengle, Jr. | 428/332 |
| 3,922,451 | 11/1975 | Anschutz et al. | 428/35 |
| 3,937,853 | 2/1976 | Shank, Jr. | 428/35 |

Primary Examiner—William R. Dixon, Jr.
Attorney, Agent, or Firm—Donald K. Wedding

[57] ABSTRACT

There is disclosed a glass-based container having at least a portion of its external surface coated after the annealing of the glass with a protective, decorable, water-removable, organic polymeric film which can be removed by an aqueous medium such that the annealed glass container base can be recovered, recycled, and reused.

5 Claims, No Drawings

PROCESS FOR RECOVERING, RECYCLING AND REUSING A COMPOSITE CONTAINER

RELATED APPLICATION

This application is a division of copending U.S. patent application Ser. No. 541,416 filed Jan. 16, 1975 which in turn is a continuation-in-part of copending U.S. patent application Ser. No. 189,450 filed Oct. 14, 1971 (now abandoned).

BACKGROUND OF THE INVENTION

This invention relates to the preparation of a novel glass-based container. More especially, this invention relates to the preparation of a decorable container which is resistant to both scratching and shattering and which can be economically recovered and recycled for further use.

Glass containers are manufactured in a variety of colors. When such containers are recovered for recycle, it is typically necessary to separate the recovered containers on the basis of color.

In accordance with this invention, there is prepared a glass-based container which has increased scratch and shatter resistance and improved decorability, and which can be readily recovered for recycling without separation by color.

More particularly, in accordance with the practice of this invention, there is prepared an annealed glass container having at least a portion of its external surface coated with a protective, decorable, water removable, organic polymeric film, said polymeric film being capable of removal by aqueous medium such that the glass base material can be recovered, recycled, and/or reused.

It is well-known that glass in its pristine condition is a very strong material, but that scratches and abrasion on the glass surface will considerably decrease its strength. Consequently, glass articles; for example, containers such as jars, bottles, tumblers, and the like, have maximum strength immediately after formation; however, this strength diminishes when the glass article surface contacts other surfaces as may occur during the inspection, handling, packaging, shipping and consumer use of the article.

To overcome this problem, there has been a great deal of research in the glass industry towards development of thin, tenaciously adhering, lubricious, damage-preventive coatings which preserve the glass strength and allow the glass article to be handled and used by the consumer.

In the glass container industry, such damage-preventive coatings have been primarily of two types. In one type, the container is coated with a thin organic coating at the "cold end" of the annealing lehr where the temperature is in the neighborhood of 200°–400° F. These coatings have been polyoxyethylene stearate as in U.S. Pat. No. 2,813,045 (Abbott); polyethylene as in U.S. Pat. No. 2,995,533 (Parmer and Schaefer), and U.S. Pat. No. 2,965,596 (Scharf); or other organic materials as in U.S. Pat. Nos. 3,445,275 (Bogart); 3,487,035 (Bogart); 3,357,853 (Pickard) and 3,296,174 (Pickard).

In the second type of coating, the glass container is first coated with metal oxides such as the oxides of tin, titanium, vanadium, or zirconium at the hot end of the annealing lehr where the temperature is in the range of 1000° to 1100° F. and then overcoated with a protective organic coating at the cold end of the lehr. Such dual coatings are illustrated in U.S. Pat. Nos. 3,323,889 (Carl and Steigelman); 3,425,859 (Steigelman); 3,598,632 (Long); 3,554,787 (Plymale); 3,498,825 (Wiens); 3,418,154 (Rawski); 3,420,693 (Scholes and Pickard); 3,445,269 (Bruss, et al.); 3,407,085 (Kitaj, et al.); 3,414,429 (Bruss, et al.); and 3,352,707 (Pickard). The above types of coatings are "production line" coatings because their application is accomplished as part of the forming and annealing sequence. The disclosures of these patents are incorporated herein by reference.

The application of water-soluble scratch-resistant coating to a glass surface is described in Benford and Mielke, U.S. Pat. No. 3,577,256. A dilute aqueous solution containing at least three water-soluble ingredients — an acrylic polymer, a polyoxyethylene glycol, and a melamineformaldehyde resin — is applied to the surface of freshly drawn glass tubing. This coating provides temporary resistance against scratching during handling and is intended to be removed by thermal decomposition during subsequent annealing of the tubing. The coating can also be removed by washing with water. The coating is not a part of the final manufactured article, and, hence, it cannot provide resistance to either scratching or shattering of that article. Since the function of the coating is to provide scratch protection but not resistance to shattering, very thin coatings are adequate and it is not essential that the coating materials be of sufficiently high molecular weight to be film forming.

Glass containers are sometimes fractured by dropping or other accidental misuse. This problem is particularly acute when the glass container has pressurized contents such as in the case of beer or carbonated soft drinks.

In accordance with this invention, there is provided a coating for glass containers which is capable of retaining broken glass fragments upon fracture of the glass container so as to reduce the incidence of accidental injury.

Attention has been directed to this problem in the recent past. For instance, German patent disclosure No. 2,026,909, published Dec. 10, 1970, discloses coating a glass container with a loosely or firmly adhering plastic material designed to form a "bag" which retains glass fragments when the container is broken. The film is formed by fusing powdered polyethylene to the glass bottle. German patent document No. 2,149,219, published May 25, 1972, discloses coating glass containers with a film coating of a hydrolyzed ethylene-vinyl acetate copolymer. U.S. Pat. No. 3,178,049 discloses a light, composite glass container having a wall thickness of about 0.15 to 0.70 millimeters surrounded on the outside by an envelope of a thermoplastic material having a wall thickness at least equal to the glass. U.S. Pat. No. 3,415,673 discloses glass containers which are made resistant to breakage by coating the exterior surface with a thin, highly adhesive layer of plastic consisting essentially of a copolymer of ethylene. A primer is used to tenaciously adhere the copolymer to the surface of the glass article.

The present invention improves over these types of coatings and provides an economical and expedient method of coating glass containers to provide the capability of retaining glass fragments upon fracture. Furthermore, this invention provides a convenient and economical method of separating and recovering the glass and the coating material from used containers, thus facilitating the recycling of either or both of these materials.

DESCRIPTION OF THE INVENTION

Any suitable previously annealed glass substrate is contemplated. However, in the typical practice of this invention, there is utilized a previously annealed glass container. The following description of embodiments and specific practices of this invention will generally be discussed in terms of a glass container substrate.

In accordance with the present invention, a shatter-resistant protective coating of a water-removable, film-forming, thermoplastic, organic polymer is applied to the surface of a previously annealed glass base or substrate, especially a glass container. The coating is relatively thick, typically having a thickness of at least 0.002 inch, so as to provide protection against scratching and shattering during the lifetime of the container. After the container has been used and returned for recycling, the coating is removed by washing with an aqueous medium in order to recover the separated glass and/or coating material for recycling.

The term "film-forming", as used herein, is intended to signify that the polymeric coating material is of sufficiently high molecular weight, and of sufficient thickness, to permit its removal as a solid, flexible, self-supporting film.

The polymeric film is typically selected from any water soluble and/or water dispersible material such as poly(ethylene oxide); poly (propylene oxide); ethylene oxide-propylene oxide copolymers; polyvinyl-pyrrolidinone; polyethyleneimine; poly (methyl vinyl ether); polyacrylamide; polymethacrylamide; poly (vinyl acetate); polyvinyl formal; poly (alkyl methacrylates); methyl cellulose; ethyl cellulose; hydroxyethyl cellulose; hydroxypropyl cellulose; sodium carboxymethyl cellulose; methyl hydroxypropyl cellulose; poly (acrylic acid) and salts thereof; poly (methacrylic acid) and salts thereof; ethylene-maleic anhydride copolymers; ethylene-vinyl alcohol copolymers; ethylene-acrylic acid copolymers; vinyl acetate-vinyl alcohol copolymers; methyl vinyl ether-maleic anhydride copolymers; and emulsifiable polyurethanes.

The common characteristic of the selected polymeric material is that it must be film-forming solid at ambient temperature, and readily removable by an aqueous medium so that it can be separated from the glass, for purposes of recovery and/or waste disposal of one or both materials. The polymeric material need not be completely soluble in the aqueous medium; it is sufficient that it be dispersible in the aqueous medium, or that the adhesion of the polymeric material be significantly reduced in the presence of the aqueous medium.

As used herein, "aqueous medium" is defined as comprising water; aqueous acids and bases especially dilute aqueous solutions of HCl, $H_2SO_4$, NaOH, and $NH_4OH$; aqueous salt solutions; and aqueous soap or surfactant solutions. Likewise, mixtures of water and miscible organic solvents are contemplated. Ths a wide variety of solutions and mixtures are contemplated so long as the selected medium serves to reduce the adhesion between the film and base material.

The "aqueous medium" may be used at ambient or elevated temperatures, and may be applied to the film by means of immersion in a bath with or without mechanical agitation; a spray jet; a falling stream; etc.

The film may also be selected for its decorative qualities. Thus the film may be loaded with fillers, pigments, dyes, etc., for purposes of providing color. Also other materials such as plasticizers, stabilizers, surfactants, etc. may be incorporated. Likewise, labels, advertisements, decorations, etc., may be printed directly onto the film, or may be applied to the container and subsequently covered by the film.

The incorporation of colorants in the coating is particularly advantageous, in that containers having a variety of colors can be produced without the usual requirement that recovered glass be color-sorted prior to recycling.

The incorporation of additives in the film may also serve other functions. Additives such as dyes and ultraviolet absorbers may be incorporated in order to protect the contents of the container from ultra-violet or visible radiation. Materials such as fluorescent dyes, fluorescent pigments, or magnetic pigments may be incorporated in order to facilitate the automatic detection and/or sorting of used containers prior to waste disposal.

Applications of the polymeric film to the previously annealed container may be accomplished by any of several methods, such as spray coating, dip coating, roller coating, powder coating, etc. Alternatively, the film may be handled as a self-supporting film or sleeve, and may be attached to the container by adhesive bonding and/or by warming the film to its softening temperature.

It is convenient, but not essential, to apply the film from a solution or dispersion of the film-forming polymer in a volatile liquid. Suitable volatile liquids include organic solvents in addition to water and aqueous solutions.

If the film is applied as a solution of dispersion in a volatile liquid, it is contemplated that said solution or dispersion will ordinarily contain about 5% to 60% by weight of the film-forming polymer and about 40% to 95% by weight of the volatile liquid, based on the total weight amount of film-forming polymer and volatile liquid present in the solution or dispersion. Other ingredients present in the solution or dispersion are not to be considered in the calculation of these proportions.

In comparison to alternative processes for separating a film coating from a container, such as combustion or mechanical stripping, the use of a water-removable film material offers several advantages. Removal of the film can be accomplished without melting, softening, scratching or breaking the container, and with a minimum of mechanical handling. Furthermore, the removed polymeric material can be appropriately recovered from the aqueous medium by various processes and recycled for further use thereby minimizing air, water, and other environmental pollution. Typical recovery processes include evaporation, precipitation, filtration, skimming, etc.

In one embodiment of the present invention, a cellular ("foamed") coating of a film-forming, water-removable, thermoplastic organic polymer is applied to the outer surface of a previously annealed glass container by the incorporation of a chemical blowing agent (e.g. an azo compound) into a solution or dispersion of the film-forming polymer, followed by drying and heating to the decomposition temperature of the blowing agent. The use of physical blowing agents is also contemplated. Alternatively, a foamed sheet of film-forming, water-removable thermoplastic organic polymer is fabricated separately and subsequently applied to the surface of a previously annealed glass container with the aid of adhesive bonding, heat sealing, and/or thermal shrinkage.

We claim:

1. A process for the preparation of a coated annealed glass container and recovering, recycling and reusing the glass container in the manufacture of a further glass container comprising applying a film to at least a portion of the external surface of a previously annealed glass container; said film consisting essentially of a water removable thermoplastic organic polymer and having a thickness of at least 0.002 inch and sufficient to provide scratch and shatter resistance for the glass container and to retain broken glass fragments upon fracture of the glass container so as to reduce the incidence of accidental injury; said polymer being water soluble or dispersible and being selected from the group consisting of poly(ethylene oxide), poly (propylene oxide), ethylene oxide-propylene oxide copolymers, polyvinylpyrrolidinone, polyethyleneimine, poly(methyl vinyl ether), polyacrylamide, polymethacrylamide, poly(vinyl acetate), polyvinyl formal, poly(alkyl methacrylates), methyl cellulose, ethyl cellulose, hydroxyethyl cellulose, hydroxypropyl cellulose, sodium carboxymethyl cellulose, methyl hydroxypropyl cellulose, poly (acrylic acid) and salts thereof, poly(methacrylic acid) and salts thereof, ethyene-maleic anhydride copolymers, ethylene-vinyl alcohol copolymers, ethylene-acrylic acid copolymers, vinyl acetate-vinyl alcohol copolymers, methyl vinyl ether-maleic anhydride copolymers, and emusifiable polyurethanes; subjecting at least said external surface of said film to an aqueous medium to remove said film therefrom and recovering, recycling and reusing said glass container in the manufacture of a further container.

2. The invention of claim 1 comprising the further steps of recovering and recycling said polymer and applying said recycled polymer as a film to at least a portion of the external surface of said further glass container.

3. The invention of claim 1 wherein a liquid coating medium is applied to said surface of said container and subsequently dried, said coating medium consisting essentailly of a solution or dispersion of 5-60% by weight of a water-removable, film-forming thermoplastic organic polymer in 40-95% by weight of a volatile liquid.

4. The invention of claim 3 wherein said polymer is removed by an aqueous medium selected from water, aqueous acids, aqueous bases, aqueous salt solutions, and aqueous soap or surfactant solutions.

5. The invention of claim 3 wherein said polymer is removed by a mixture of water and a miscible organic solvent.